United States Patent
Panagotacos et al.

(10) Patent No.: US 7,808,581 B2
(45) Date of Patent: Oct. 5, 2010

(54) LOW PROFILE BACKLIGHT APPARATUS

(75) Inventors: George Panagotacos, Corona, CA (US); David G. Pelka, Los Angeles, CA (US)

(73) Assignee: Teledyne Lighting and Display Products, Inc., Los Angeles, CA (US)

( * ) Notice: Subject to any disclaimer, the term of this patent is extended or adjusted under 35 U.S.C. 154(b) by 143 days.

(21) Appl. No.: 12/016,727

(22) Filed: Jan. 18, 2008

(65) Prior Publication Data

US 2009/0185107 A1 Jul. 23, 2009

(51) Int. Cl.
*G02F 1/1335* (2006.01)

(52) U.S. Cl. .............................. 349/69; 349/61; 349/62; 349/66; 349/67

(58) Field of Classification Search ................... 349/62, 349/64, 69
See application file for complete search history.

(56) References Cited

U.S. PATENT DOCUMENTS

| | | | |
|---|---|---|---|
| 5,369,350 A | 11/1994 | Matsuda | |
| 5,404,869 A | 4/1995 | Parkyn et al. | |
| 5,577,493 A | 11/1996 | Parkyn, Jr. et al. | |
| 5,655,832 A | 8/1997 | Pelka et al. | |
| 5,691,788 A * | 11/1997 | Kim | 349/96 |
| 5,986,728 A * | 11/1999 | Bernard | 349/68 |
| 6,007,209 A | 12/1999 | Pelka | |
| 6,134,092 A | 10/2000 | Pelka et al. | |
| 2004/0252255 A1 * | 12/2004 | Folkerts | 349/61 |
| 2006/0227545 A1 | 10/2006 | Mok et al. | |
| 2007/0091613 A1 * | 4/2007 | Lee et al. | 362/326 |

FOREIGN PATENT DOCUMENTS

| | | |
|---|---|---|
| EP | 0 893 727 A1 | 1/1999 |
| EP | 1 155 351 B1 | 11/2001 |
| EP | 1 486 818 A2 | 12/2004 |
| JP | 60 140322 A | 7/1985 |
| JP | 2002 352611 A | 12/2002 |
| WO | WO 2007/017833 A1 | 2/2007 |
| WO | WO 2007/050274 A1 | 5/2007 |

OTHER PUBLICATIONS

International Search Report in Application No. PCT/US09/030831 dated Apr. 9, 2009.
Written Opinion of the International Searching Authority in Application No. PCT/US09/030831 dated Apr. 9, 2009.
Pelka, et al., "An Overview of LED Applications for General Illumination", (Conference Proceedings Paper), SPIE vol. 5816, Nov. 2003.
Pelka, et al., Keen Forms of Kinoforms—Kinoform-based Diffusers Help Lighting Designers Leverage Unique LED Advantages, OE Magazine, vol. 3 No. 10, p. 19, Oct. 2003.

\* cited by examiner

*Primary Examiner*—David Nelms
*Assistant Examiner*—Phu Vu
(74) *Attorney, Agent, or Firm*—K&L Gates LLP

(57) ABSTRACT

A backlight apparatus includes a point source of radiant electromagnetic energy. A total internal reflection (TIR) lens has a vertical central axis located along a path of the radiant electromagnetic energy. The TIR lens receives and evenly distributes the radiant electromagnetic energy at an output face. The radiant electromagnetic energy exiting the TIR lens is substantially collimated and defines vertical optical paths parallel to the vertical central axis. A first diffuser receives the radiant electromagnetic energy from the output face of the TIR lens and spreads the radiant electromagnetic energy to a predetermined first angle relative to the vertical optical paths.

24 Claims, 7 Drawing Sheets

LOW PROFILE BACKLIGHT APPARATUS

BACKGROUND

Brightness enhancement films (BEFs), otherwise known as prism sheets, are made by forming a prism pattern on optical substrate film. The BEFs serve to concentrate light toward the output side of a backlight, when they are incorporated onto the front surface of that backlight. The prism sheet is, in essence, a film for boosting brightness levels while keeping the power consumed a constant. FIG. 1 illustrates a common architecture employed in liquid crystal displays 1 (LCDs). A cold fluorescent light 5 and a light guideplate 6 act as a backlight to transmit light through first and second BEFs 4a and 4b, otherwise known as prism sheets, that are crossed 90° relative to each other. Prior to entering the first BEF 4a the light passes through a first diffuser 3a. Light emanating from the second BEF 4b passes through a second diffuser 3b and finally through an LCD panel 2. In the configuration illustrated in FIG. 1, the BEFs 4a,b provide an output radiation (light) pattern that is restricted to about ±21°.

The BEFs 4a,b utilize a prismatic structure to provide brightness gain. The BEFs 4a,b direct the light through the LCD panel 2, thereby providing increased brightness toward the on-axis viewer. A single sheet (e.g., the first BEF 4a) provides up to 60% increase in brightness and two sheets crossed at 90° (e.g., the first and second BEFs 4a,b as shown in FIG. 1) can provide up to 120% brightness increase. The increased brightness provides power savings. Single sheets of BEFs 4a may be used with LCD panels 2 in monitors and televisions. Crossed sheets of BEFs 4a,b may be used with LCD panels 2 in notebook personal computers.

As shown in FIG. 1, a backlight is a form of illumination used in LCDs. Backlights illuminate the LCD from the side or back. Backlights increase visibility of small and large displays in low light or bright sunlight conditions. In computer displays and LCD televisions, backlights produce light in a manner similar to a CRT display. Backlights can be color or monochrome. Color LCD displays such as those used for television or computer monitors generally use white backlights to cover most of the color spectrum.

Large area backlight systems are used in a variety of large display systems including laptop or notebook computer systems, large screen LCD screens, sunlight readable avionic/automotive displays, air traffic control displays, and medical display systems, to mention a few. Systems such as commercial aircraft cockpit displays and automotive displays including global positioning systems (GPS) navigation systems require extremely bright backlit LCD displays.

Twisted nematic (TN) and super-twisted (STN) LCD are types of displays that suffer from poor performance when viewed at wide viewing angles due to the optical characteristics of TN and STN liquid crystal materials. Color shift and decreased contrast are due to differences in the optical path length of light rays transmitted through the liquid crystal material viewed at high viewing angles versus light rays viewed at near-normal angles. LCD designers have tried to overcome this problem by careful choice of liquid crystal materials and by utilizing various internal LCD modifications.

Conventional large area backlight systems utilize an array of point sources of radiant electromagnetic energy such as light emitting diodes (LEDs) providing direct light emission to an output aperture surface of the backlight system. An optical cavity is formed between the point sources and the output aperture surface. Conventional backlight systems require relatively deep optical cavities in order to mix the light within the optical cavity. Diffusers provide better surface uniformity, but reduce the light output and decrease the overall efficiency of the backlight system. In addition, it is difficult to reduce or tailor the field of view with conventional LED/waveguide technology for backlight systems. There is a need for a new and improved backlight system to collimate the light output from the point sources and direct the collimated light to an output aperture and diffuser to spread the light output and tailor it to the output field of view.

SUMMARY

In one embodiment, a backlight apparatus comprises a point source of radiant electromagnetic energy. A totally internally reflection (TIR) lens having a vertical central axis is located along a path of the radiant electromagnetic energy to receive and evenly distribute the radiant electromagnetic energy at an output face. The radiant electromagnetic energy exiting the TIR lens is substantially collimated and defines vertical optical paths parallel to the vertical central axis. A first diffuser receives the radiant electromagnetic energy from the output face of the TIR lens and spreads the radiant electromagnetic energy to a predetermined first angle relative to the vertical optical paths.

FIGURES

DESCRIPTION

Before explaining the various embodiments in detail, it should be noted that the embodiments are not limited in their application or use to the details of construction and arrangement of parts illustrated in the accompanying drawings and description. The illustrative embodiments may be implemented or incorporated in other embodiments, variations and modifications, and may be practiced or carried out in various techniques. The backlight apparatus configurations disclosed below are illustrative only and not meant to limit the scope or application thereof. Furthermore, unless otherwise indicated, the terms and expressions employed herein have been chosen for the purpose of describing the illustrative embodiments for the convenience of the reader and are not to limit the scope thereof.

In one embodiment, a backlight apparatus comprises an array of total internal reflection (TIR) optic elements to collimate light from a point source, pass the collimated light through and LCD element, and subsequently spread the light to a predetermined field-of-view. The field-of-view may be determined from the perspective of the viewer. The collimated light may be redirected to the predetermined field-of-view using a diffuser system. In one embodiment, a backlight apparatus comprises an LED point source and an array of TIR lenses to collimate the light from the LED point source. The collimated light may be redirected to a predetermined field-of-view using a holographic diffuser.

Figure 2:
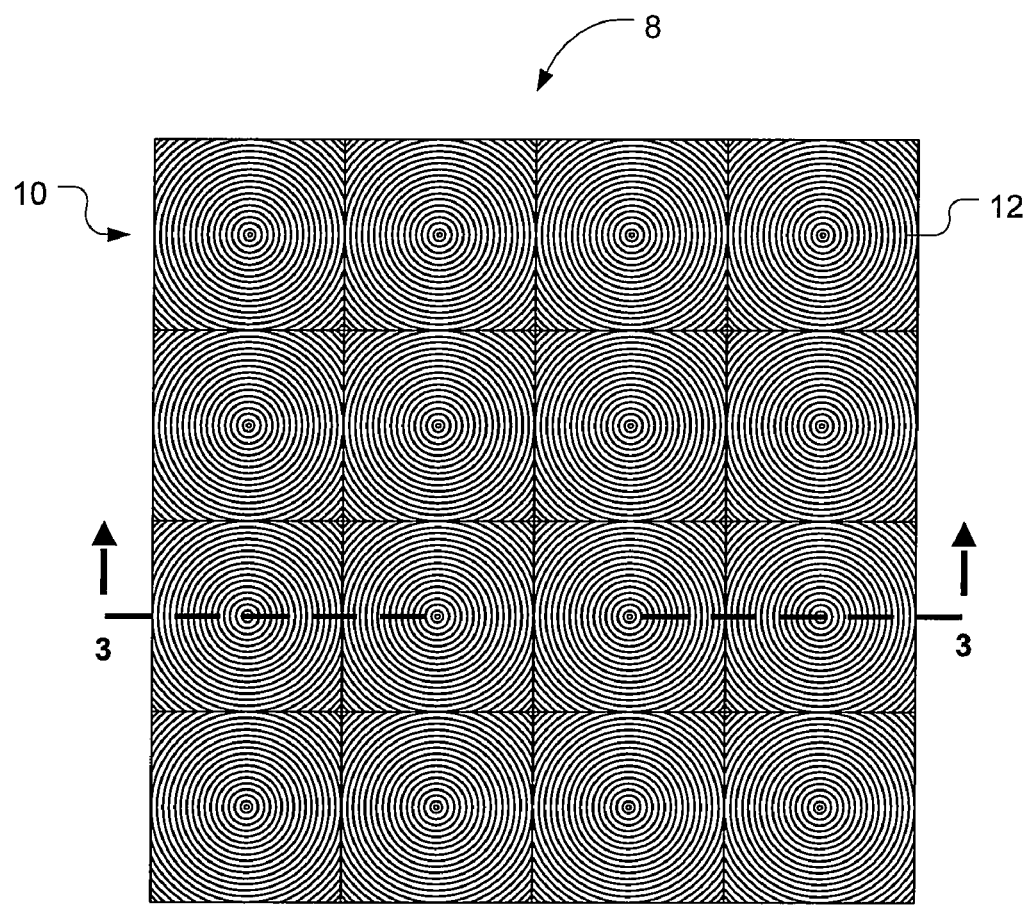
FIG. 2 illustrates one embodiment of a low profile backlight apparatus comprising a lens array.

FIG. 2 illustrates one embodiment of a low profile backlight apparatus 8 comprising a lens array 10. Those skilled in the art will appreciate that a low profile lens may be defined as a lens having an f# (e.g., the ratio of the focal distance to the diameter of the lens) in the range of approximately 0.2 to 0.3 as a function of the index of refraction of the material. For example, polycarbonate as an f#≈0.2, optical grade acrylic has an f#≈0.2,5 and silicone has an f#≈0.3. The lens array 10 employs optic elements to collimate light emitted by a point source, pass the collimated light through an LCD element, and subsequently spread the light transmitted through the LCD element to a predetermined field-of-view. The field-of-view may be determined from the perspective of a viewer. In the illustrated embodiment, the lens array 10 is formed as a 4×4 array of individual square lens elements 12. The lens elements 12 may be referred to as pixels. It should be understood that the array may include any integer number of individual lens elements 12 arranged as an n×m matrix, where n and m are any integer and in one embodiment n=m. The size and shape of the individual lens elements 12 may be selected depending on the particular application. In the illustrated embodiment, each lens element 12 defines a square. In other embodiments, the lens elements 12 may be formed of numerous sizes and shapes, such as the hexagonal shaped lens element 142 shown in FIG. 8, for example. In other embodiments, the shape of the lens elements 12 may be selected from numerous other suitable polygonal shapes. Therefore, the embodiments are not limited in this context.

Figure 3:
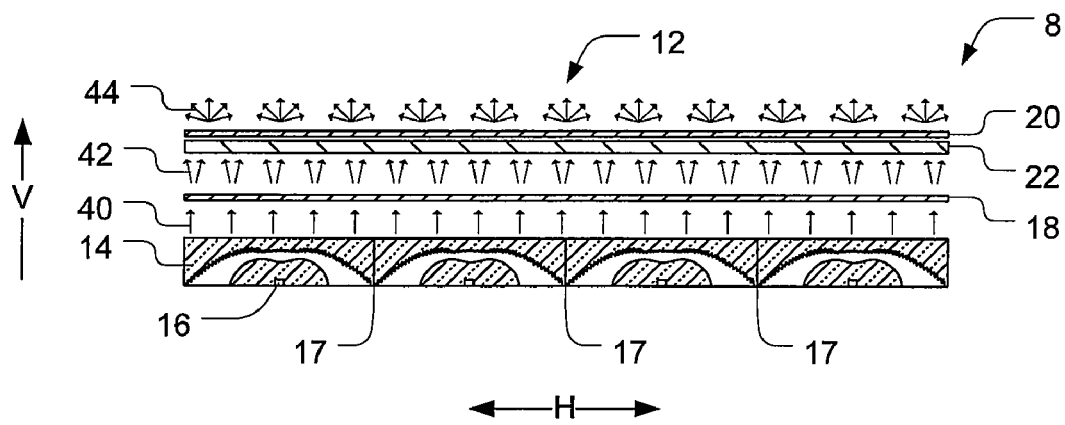
FIG. 3 is a cross-sectional view of the lens array shown in FIG. 2 taken along line 3-3.

FIG. 3 is a cross-sectional view of the lens array 10 taken along line 3-3. Each of the individual lens elements 12 comprises a lens 14 and a point source 16 of radiant electromagnetic energy. In one embodiment, each of the individual lens elements 12 may comprise total internal reflection (TIR) optic elements to collimate light from the point source 16 and a diffuser to subsequently spread the light rays of the collimated light 42 to a predetermined field-of-view from the perspective of the viewer, for example. The point source 16 for the backlight apparatus 8 may comprise any source of radiant electromagnetic energy including, for example, an incandescent light bulb, one or more light-emitting diodes (LEDs), an electroluminescent panel (ELP), one or more cold cathode fluorescent lamp (CCFL), or hot cathode fluorescent lamps (HCFL). The point source 16 may generate color light although white light LED backlighting is also contemplated in the various embodiments of the backlight apparatus 8. In one embodiment, the point source 16 may comprise one or more red-green-blue (RGB) LED point sources. The light emitted by the LEDs is slightly diffused by a diffuser 18. The diffuser 18 slightly increases the angular spectrum of the collimated light 40 to the pattern of the light 42 to minimize or eliminate interstitial dark lines 17 produced by the lens-to-lens juxtaposition of the lenses 14. The angular spectrum of the light 42 may be slightly increased to approximately ±6° to ±10° relative to the collimated light 40. The collimated light 40 is passed through the LCD element 22, and subsequently the angular spectrum of the light is further increased or spread to the pattern of the light 44 by a diffuser 20, and in particular, is diffused in the horizontal direction H. The light rays of the collimated light 40 propagate along vertical optical paths parallel to a vertical central axis 24. The light 40 is substantially collimated such that the light propagates at an angle of less than approximately +/−2° relative to the vertical optical paths for a TIR lens of 25.4 mm, for example.

The light 40 emanating from the point source 16 is collimated in the vertical direction V by the lens 14. Collimating the light 40 in the vertical direction V minimizes chromatic aberration and removes chromatic dispersion due to different path lengths of the light emitted by the RGB point source 16. The collimated light 40 is redirected to a specified or predetermined field-of-view using a diffuser system. In one embodiment, the diffuser system may comprise one or more diffusers. In one embodiment, the collimated light 40 may be transmitted through the diffuser 18 and subsequently through an LCD element 22. In one embodiment, the diffuser 18 may be a microstructured surface formed on the flat surface of the exit face 38 (FIG. 4) of the lens 14 or may be formed as a separate element. In the illustrated embodiment, the diffuser 18 is formed as separate element and is configured to collimate the light 42. The light 42 emanating from the LCD element 22 is subsequently transmitted through a diffuser 20 that is configured to spread the light rays of light 44. The diffuser 20 spreads the light 44 to a predetermined field-of-view, thus providing a wide viewing angle for the viewer. The diffuser 20 may be implemented as a holographic diffuser, otherwise known as a kinoform diffuser, to redirect or spread the collimated light 40 to output light 44 at a predetermined field-of-view. Examples of holographic diffusers are described in "An Overview of LED Applications for General Illumination" (Conference Proceedings Paper), David G. Pelka, Kavita Patel, SPIE Vol. 5186, November 2003; and "Keen Forms of Kinoforms—Kinoform-based Diffusers Help Lighting Designers Leverage Unique LED Advantages," David G. Pelka, OE Magazine, Vol. 3 No. 10, p. 19, October 2003, both of which are incorporated herein by reference.

Figure 1:
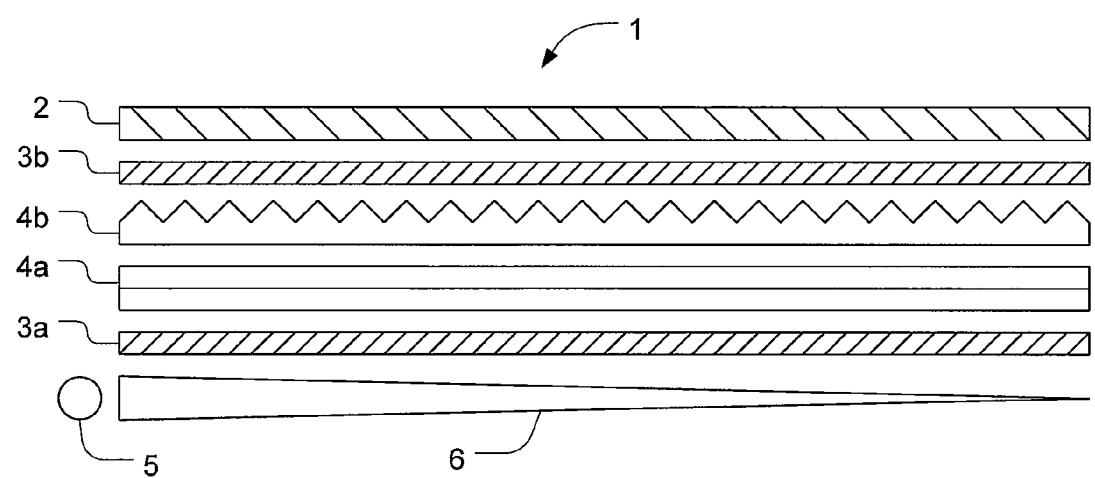
FIG. 1 illustrates a common architecture employed in liquid crystal displays (LCDs)

In one embodiment, the backlight apparatus 8 illustrated in FIGS. 2 and 3 is sufficient to illuminate a substantially large area LCD as may be required in a specific application (e.g., large LCD televisions). The backlight apparatus 8 may be substantially wide in the horizontal direction H and substantially thin in the vertical direction V to eliminate the need for brightness enhancing films (e.g., see FIG. 1 and associated description above). The collimated light 40 transmitted through the diffuser 18 and a TN or STN LCD element 22 remains substantially collimated to maximize contrast and minimize color shift, but may be spread slightly from an angle of approximately +/−2° up to approximately +/−10° relative to the vertical optical paths defined by the collimated light 40. Because most modern applications demand wider viewing angles, the diffuser 20 may be formed as a diffusing screen to further spread the collimated light 40, 42 after it has passed through the diffuser 18 and the LCD element 22. The diffuser 20 further spreads the light 44 to an angle greater than +/−10° relative to the vertical optical paths defined by the collimated light 40 after it has passed through the LCD element 22. The lens array 10 provides high optical efficiency, low backscatter of ambient light to maintain high image contrast, and wide viewing angle.

It is desirable that the highly collimated light 40 may be generated by a sufficiently thin (e.g., f#≦0.25 for an index of refraction that is ≧1.5 for a transparent material) backlight point source 16 and optics to preserve the overall thinness (e.g., low profile) of the backlight apparatus 8. Thinner backlights are more desirable given the trend of producing larger and thinner displays for computers and televisions, for example. A substantially thin backlight apparatus 8 maximizes contrast and minimizes color shift with respect to the viewing angle of the LCD element 22. Such a solution is independent (external) of the LCD element 22 and can be made without modifying the LCD element 22 internally. This provides a substantially improved low profile backlight apparatus 8 with reduced cost for use in many applications such as LCD monitors, notebook computers, auto navigation displays, avionics displays, air traffic control displays, and medical display systems, among others whether or not described herein. In one embodiment, the backlight apparatus 8 may be formed with a vertical thickness of approximately 10-13 mm. The individual lens elements 12 may be formed as TIR lens elements having a vertical thickness of approximately 7-9 mm. The diffusers 18, 20 may be formed with a vertical thickness of approximately 3-4 mm to provide a thin and efficient optical diffuser stack.

Figure 4:
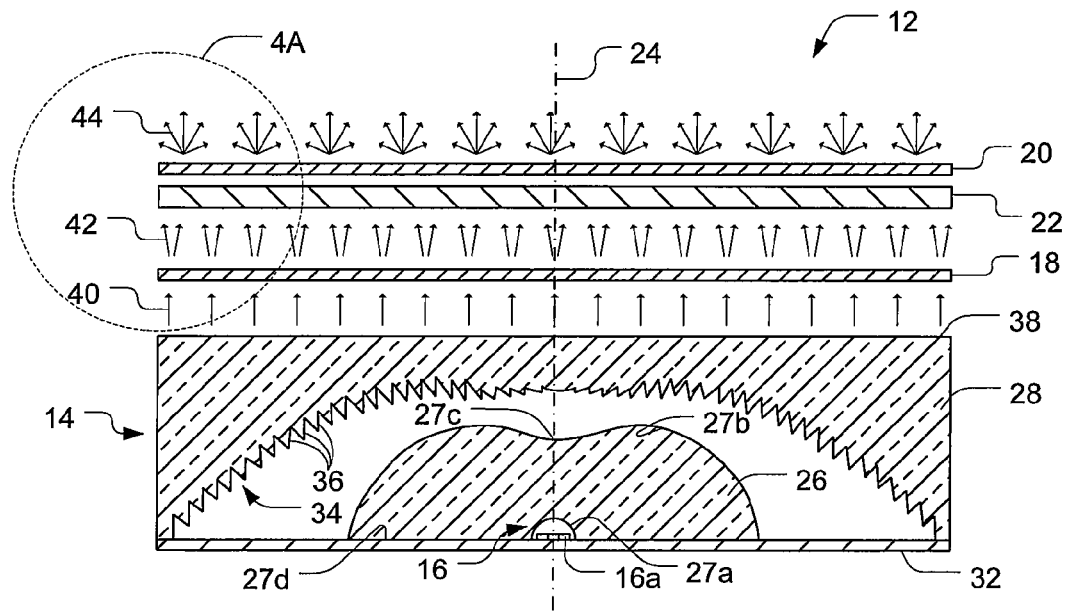
FIG. 4 is a cross-sectional view of one embodiment of a lens element comprising a lens acting as a backlight illumination source for an LCD element.

FIG. 4 is a cross-sectional view of one embodiment of the lens element 12 comprising the lens 14 acting as the backlight illumination source for the LCD element 22. In the illustrated embodiment, the lens 14 has a vertical central axis 24. The lens 14 comprises a source ray deviator lens 26, e.g., acting on the light emitted by the point source 16, a TIR lens 28, and the point source 16 comprising an RGB LED 16a. TIR lens elements similar to the lens 14 and source ray deviator lens elements similar to the source ray deviator lens 26 are disclosed in U.S. Pat. No. 5,577,493, which is incorporated herein by reference. It is desirable that the TIR lens 28 have numerous small facets 34, having entry faces 36 and, in the illustrated embodiment, an exit face 38 with a flat surface. In one embodiment, the diffuser 18 may be a microstructure surface formed on the flat surface of the exit face 38 to blur any spatial structure imposed by the facets 34. In the illustrated embodiment, the diffuser 18 is formed as a separate element from the TIR lens 28 and is vertically spatially located from the exit face 38 to integrate any blurring caused by the facets 34 such that they are not visible to the viewers of the LCD element 22. The deviator lens 26 also provides thermal protection for the TIR lens 28 when the point source 16 is a high-power output point source. The TIR lens 28 may consist of a plastic and a smooth source ray deviator lens 26 can be made of high temperature plastic, silicone, or glass, which can withstand high temperatures and act as an insulating barrier between the TIR lens 28 and the point source 16. The base of the lens 14 may be formed on a substrate 32 to provide greater angular spectrum.

Figure 6:
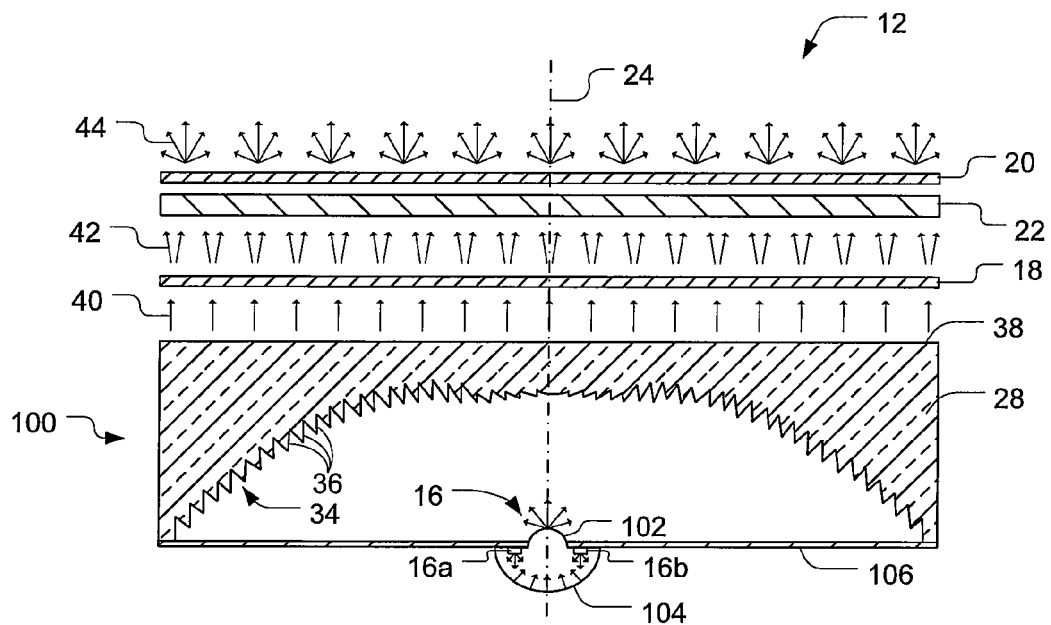
FIG. 6 is a cross-sectional view of one embodiment of a lens element comprising a lens acting as a backlight illumination source for an LCD element.

The deviator lens 26 may be used in conjunction with a reflector similar to the reflector 104 shown in FIG. 6) and the TIR lens 28. In one embodiment, the deviator lens 26 has a mushroom profile. In the illustrated embodiment, the deviator lens 26 has a hemispherically concave inner surface 27a of greater curvature (i.e., smaller radius) than the varying curvatures of a convex outer surface 27b, such curvatures decreasing at regions toward the axis 24, becoming concave (demagnifying) at a central outer surface 27c. A flat bottom surface 27d is coplanar with the outermost tip of TIR lens 28. It is thus situated so as to interfere with neither the TIR lens 28 nor a reflector, if used. The deviator lens 26 is positioned along the path of the light from the point source 16 and is positioned between the point source 16 and the TIR lens 28. The deviator lens 26 deviates light towards portions of the TIR lens 28 spaced from the vertical axis 24 to more evenly distribute the light 40 flux at the output of the TIR lens 28. The deviator lens 26 is a non-imaging optical element to transform the cumulative angular distribution of intensity of light from the point source 16 into a different distribution. The TIR lens 28 forms a uniform distribution of the light 40 exiting the flat surface of the exit face 38 of the TIR lens 28. Additional examples of TIR lens elements similar to the lens 14 are disclosed in U.S. Pat. Nos. 5,404,869 and 5,655,832, which are incorporated herein by reference.

Figure 4A:
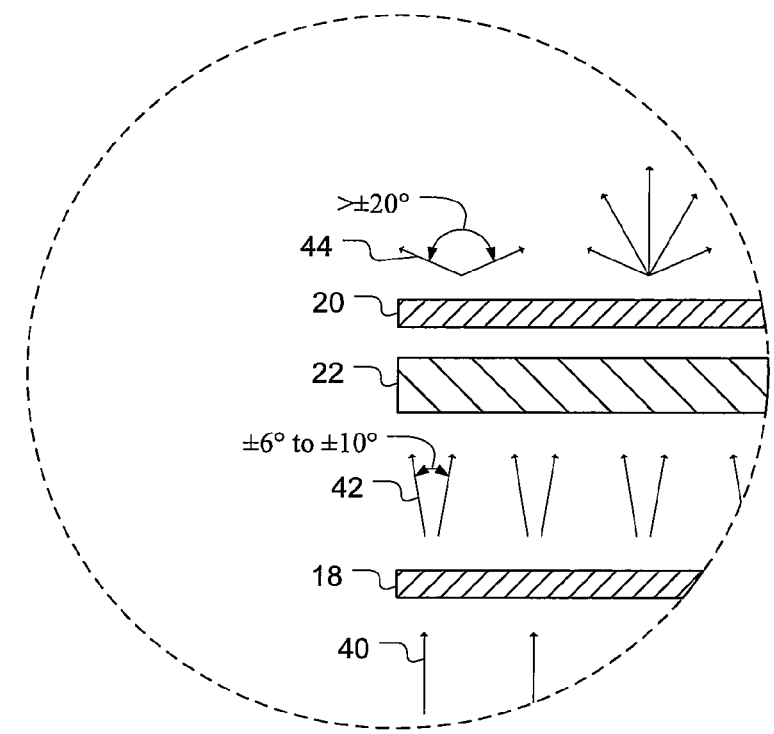
FIG. 4A is a magnified view of a portion of the lens element shown in FIG. 4.

FIG. 4A is a magnified view of a portion of the lens element 12 shown in FIG. 4. As shown in FIG. 4A, collimation of the light 40 exiting the flat surface exit face 38 of the TIR lens 28 is maintained by the diffuser 18. Light 42 exiting the diffuser 18 remains substantially collimated, but may be spread slightly to an angle of approximately ±6°, and in some embodiments up to approximately ±10°, relative to the vertical optical paths defined by the collimated light 40 before passing through the LCD element 22 to maximize contrast and minimize color shift. As previously discussed, the collimated light 42 is transmitted through the LCD element 22 and is subsequently transmitted through the diffuser 20. The diffuser 20 spreads the light 44 more than ±20° to provide a wider field-of-view in the horizontal direction H and some embodiments more than ±30° in the horizontal direction H.

Figure 5:
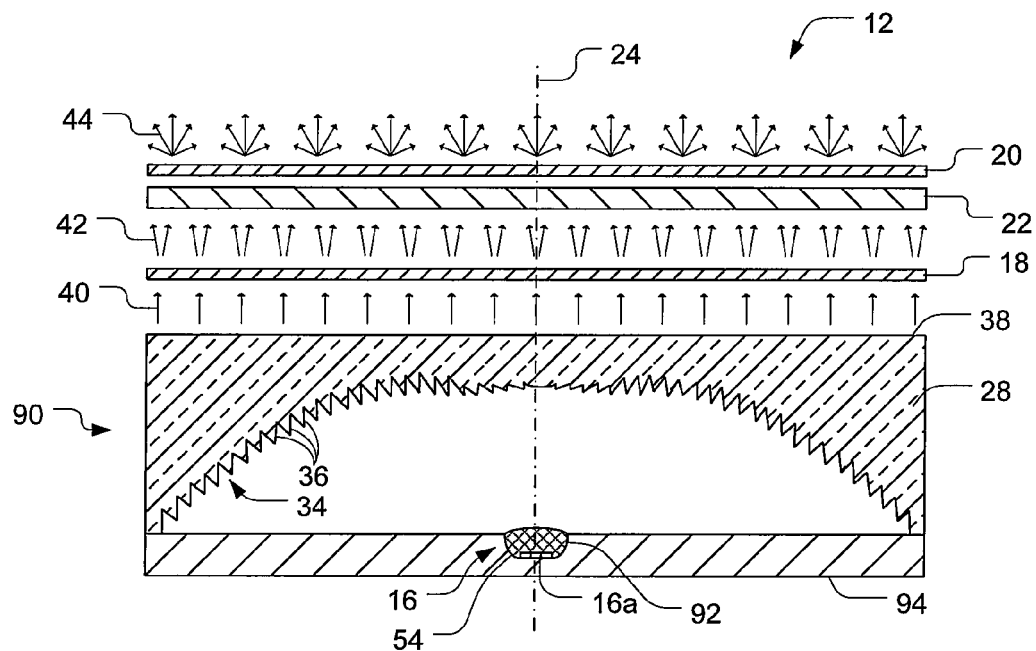
FIG. 5 is a cross-sectional view of one embodiment of a lens element comprising a lens acting as a backlight illumination source for an LCD element.

FIG. 5 is a cross-sectional view of one embodiment of the lens element 12 comprising a lens 90 acting as the backlight illumination source for the LCD element 22. In the illustrated embodiment, the lens 90 has a vertical central axis 24. The lens 90 comprises the TIR lens 28, the diffuser optic 54, and the point source 16 comprising the LED 16a previously described. The diffuser optic 54 is partially embedded within a suitable hole, channel, or recess 92 that extends into a substrate 94. Light emanating from the point source 16 is diffused by the diffuser optic 54 and is transmitted by the numerous entry faces 36 of the small facets 34 through the exit face 38 of the TIR lens 28. The angular spectrum of the light 40 is slightly increased in the horizontal direction H by the diffuser 18. The light 42 emanating from the diffuser 18 is substantially collimated to an angle of approximately ±6°, and in some embodiments, up to approximately ±10°, relative to the vertical optical paths defined by the collimated light 40 before passing through the LCD element 22. As previously discussed, the collimated light 42 is transmitted through the LCD element 22 and is subsequently transmitted through the diffuser 20. The light 44 emanating from the diffuser 20 is spread more than ±10° by the diffuser 20 to provide a wider field-of-view.

FIG. 6 is a cross-sectional view of one embodiment of the lens element 12 comprising a lens 100 acting as the backlight illumination source for the LCD element 22. In the illustrated embodiment, the lens 100 has a vertical central axis 24. The lens 100 comprises the TIR lens 28, the point source 16 comprising the LEDs 16a, b, as previously described, and a reflector 104 and a diffuser optic 102 located above the reflector 104. The reflector 104 is to reflect light from the point source 16 back towards the diffuser optic 102 and into the TIR lens 28. The reflector 104 may be formed as an integrating hemisphere comprising a highly reflective surface and may be referred to generally as a mixing chamber. The reflector 104 is located below a substrate 106. The LEDs 16a, b are located within the reflector 104 below the substrate 106. Light emitted by the LEDs 16a, b is reflected by the interior reflecting surface of the reflector 104 and are diffused by the diffuser optic 102 and are transmitted by the numerous entry faces 36 of the small facets 34 through the exit face 38 of the TIR lens 28. The light 40 is collimated by the diffuser 18. The light 42 emanating from the diffuser 18 is substantially collimated to an angle of approximately ±6°, and in some embodiments up to approximately ±10°, relative to the vertical optical paths defined by the collimated light 40 before passing through the LCD element 22. As previously discussed, the collimated light 42 is transmitted through the LCD element 22 and is subsequently transmitted through the diffuser 20. The light 44 emanating from the diffuser 20 is spread more than ±10° by the diffuser 20 to provide a wider field-of-view.

Figure 7:
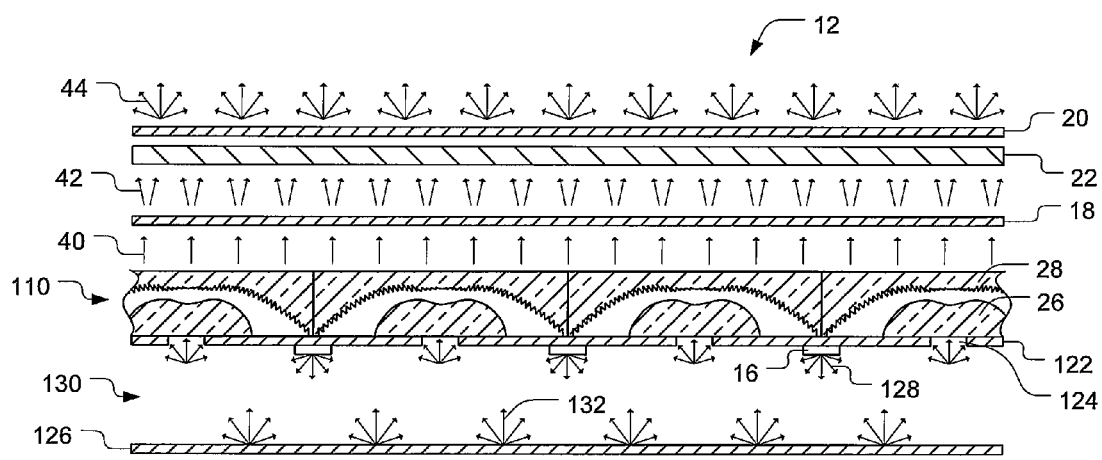
FIG. 7 is a cross-sectional view of one embodiment of a lens element comprising a lens acting as a backlight illumination source for an LCD element.

FIG. 7 is a cross-sectional view of one embodiment of the lens element 12 comprising a lens 120 acting as the backlight illumination source for the LCD element 22. The lens 120 comprises the deviator lens 26 and the TIR lens 28 previously described. The lens 120 is located above a white diffuser 122 formed with apertures 124. The point sources 16 are located on either side of the apertures 124. A solid white diffuser 126 is spatially located in the vertical direction from the white diffuser 122 to define a highly diffusely reflecting integrating cavity 130 radiated to mix light 128 radiated from the point sources 16. Light 132 reflected by the solid white diffuser 126 is received through the apertures 124 and is presented to the deviator lens 26 and subsequently to the TIR lens 28. The point sources 16 may comprise both white as well as RGB LED sources of radiation. In one embodiment, the reflecting integrating cavity 130 has a reflectance exceeding 95%. The angular spectrum of the light 40 exiting the flat exit face 38 is slightly increased by the diffuser 18. Light 42 emanating from the diffuser 18 is substantially collimated to an angle of approximately ±6°, and in some embodiments up to approximately ±10°, relative to the vertical optical paths defined by light 40 before passing through the LCD element 22. As previously discussed, the collimated light 42 is transmitted through the LCD element 22 and is subsequently transmitted through the diffuser 20. The light 44 emanating from the diffuser 20 is spread more than ±10° by the diffuser 20 to provide a wider field-of-view.

The individual lens elements 12 described above may be formed in multiple geometric shapes depending on the desired optical efficiency. Thus, the lens elements 12 may be square, rectangular, triangular, hexagonal and various other polygonal shapes. The individual lens elements 12 may be formed of any suitable polygonal shape or combinations thereof that leave no gaps in the areas where the light emanating from the LED is uncollimated. A hexagonal lens element is described below for illustrative purposes. The embodiments, however, are not limited in this context.

Figure 8:
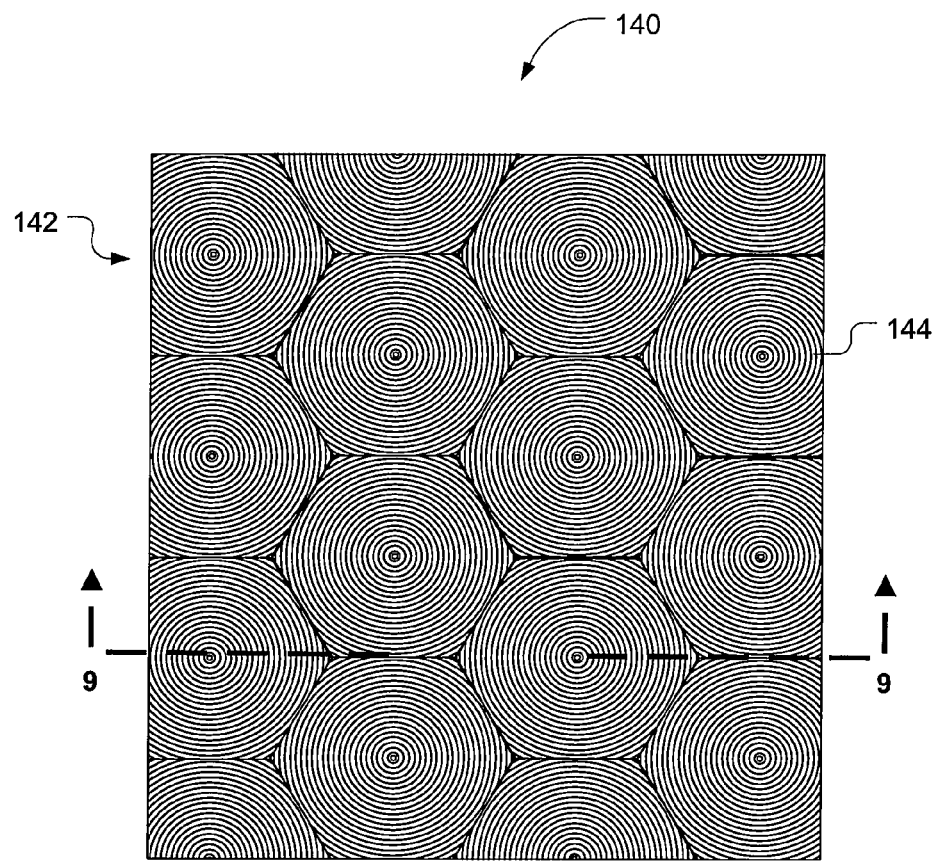
FIG. 8 illustrates one embodiment of a low profile backlight apparatus comprising a lens array.

FIG. 8 illustrates one embodiment of a low profile backlight apparatus 140 comprising a lens array 142. The lens array 142 employs optic elements to collimate light emitted by a point source, pass the collimated light through an LCD element, and subsequently spread the light that passes through the LCD element into a preferred field-of-view to provide a wider viewing angle to the viewer. In the illustrated embodiment, the lens array 142 is formed as an array of individual hexagonal lens elements 144. The lens elements 144 may be referred to as pixels. It should be understood that the array may include any integer number of individual lens elements 144 arranged as an n×m matrix, where n is any integer value and m is any integer value and in one embodiment n=m. The size and shape of the individual lens elements 144 may be selected depending on the particular application. In the illustrated embodiment, each lens element 144 defines a hexagon.

Figure 9:
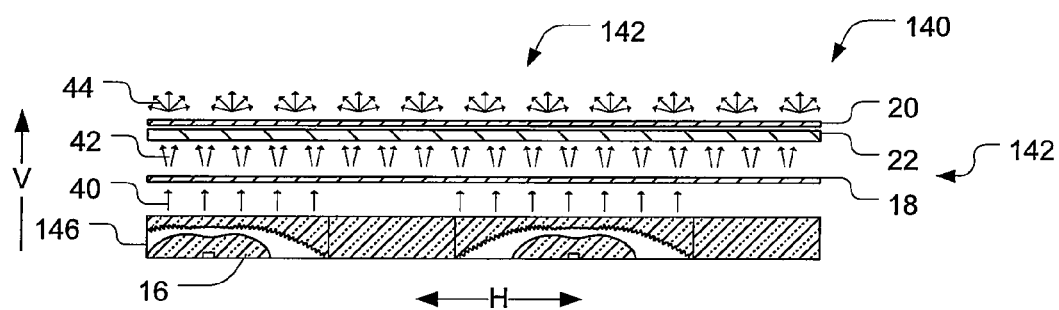
FIG. 9 is a cross-sectional view of the lens array shown in FIG. 8 taken along line 9-9.

FIG. 9 is a cross-sectional view of the lens array 142 taken along line 9-9. Each of the individual lens elements 144 comprises a lens 146 and the point source 16 of radiant electromagnetic energy. In one embodiment, the lens elements 144 may comprise TIR optic elements to collimate light from the point source 16 and diffusers to subsequently spread the collimated light 42 to a predetermined field-of-view. The point source 16 for the backlight apparatus 140 may comprise any source of radiant electromagnetic energy. In one embodiment the point source 16 may comprise white LEDs and in another embodiment the point source 16 may comprise RGB LEDs.

Figure 10:
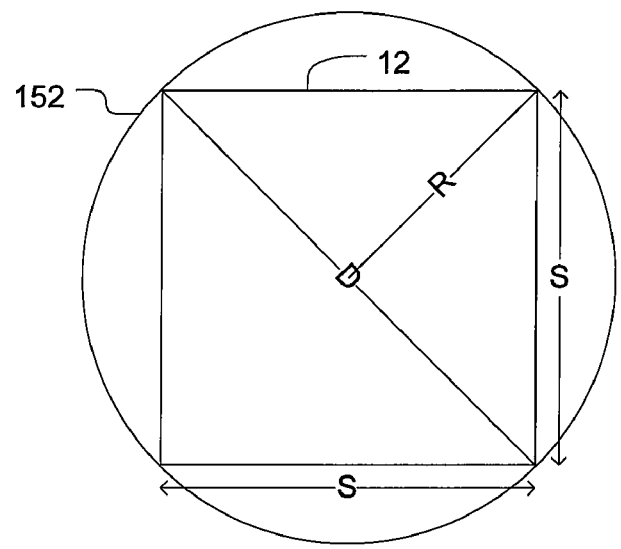
FIG. 10 illustrates one embodiment of an individual square lens element inscribed within a circle of radius R.

FIG. 10 illustrates one embodiment of an individual square lens element 12 inscribed within a circle 152 of radius R. The radius R of the circle 152 may be derived based on the sides S of the square lens element 12. The relative optical efficiency $E_{LR}$ of the square lens element 12 may be determined by the ratio of the respective area $A_L$ of the square lens element 12 and the area $A_C$ of the circle 152. The area $A_C$ of the circle 152 is given by:

$$A_C = \pi R^2$$

The area $A_L$ of the square lens element 12 is give by:

$$A_L = S^2$$

The relative optical efficiency $E_{LR}$ of the square lens element 12 is given by:

$$E_{LR} = \frac{A_L}{A_C} = \frac{S^2}{\pi R^2}$$

$$R = \frac{S}{2\sqrt{2}}$$

For S=5.08 cm (2 in), R=5.08/1.414=3.59 cm. Accordingly, $$A_C = 40.49 \text{ cm}^2$$

$$A_L = 25.81 \text{ cm}^2$$

$$E_{LR} = \frac{A_L}{A_C} = \frac{25.81}{40.49} = 0.64 = 64\%$$

It is well known in the art that a well made injection molded circular TIR lens has an optical efficiency of approximately 0.85 or 85%. Therefore, the efficiency $E_L$ of the square TIR lens element 12 is approximately:

$$E_L = 0.85 * 0.64 = 0.544 = 54.4\%.$$

Figure 11:
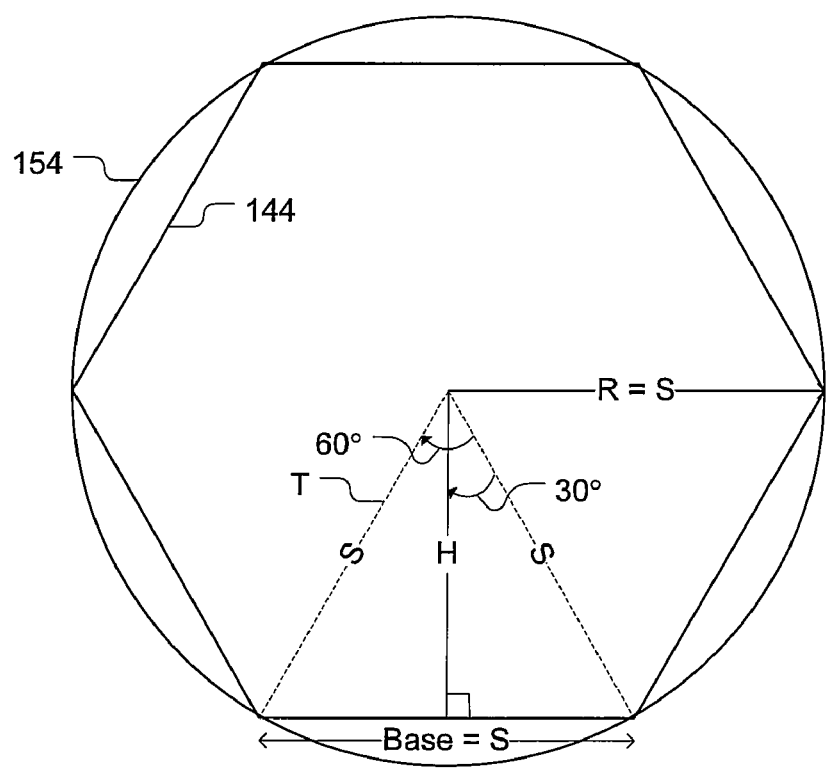
FIG. 11 illustrates one embodiment of an individual hexagonal lens element inscribed within a circle of radius R=S.

FIG. 11 illustrates one embodiment of an individual hexagonal lens element 144 inscribed within a circle 154 of radius R=S. The relative optical efficiency $E_{L1R}$ of the hexagonal lens element 144 may be determined by the ratio of the respective area $A_{L1}$ of the hexagonal lens element 144 and the area $A_{C1}$ of the circle 154. Each of the six sides S of the hexagonal lens element 144 defines an equilateral triangle T.

The area $A_T$ of one of the triangles T is given by:

$$A_T = \frac{1}{2} SH$$

The area $A_{L1}$ of the hexagonal lens element 144 is:

$$A_{L1} = 6A_T = 3SH$$

$$R = S$$

$$H = \frac{\sqrt{3}}{2}S$$

$$A_{L1} = 6A_T = \frac{3\sqrt{3}}{2}S^2$$

The area $A_{C1}$ of the circle 154 is:

$$A_{C1} = \pi R^2$$

The relative optical efficiency $E_{L1R}$ of the hexagonal lens element 144 is:

$$E_{L1R} = \frac{A_{L1}}{A_{C1}} = \frac{3SH}{\pi R^2} = \frac{3\sqrt{3}}{2\pi S}$$

For S=R=5.08 cm (2 in):

$$A_{C1} = 81.07 \text{ cm}^2$$

$$A_{L1} = 67.05 \text{ cm}^2$$

$$E_{L1R} = \frac{A_{L1}}{A_{C1}} = \frac{67.05}{81.07} = 0.827 = 83\%$$

As previously stated, it is well known in the art that a well made injection molded circular TIR lens has an optical efficiency of 0.85 or 85%. Therefore, the efficiency $E_{L1}$ of the hexagonal TIR lens element 12 is approximately:

$$E_{L1} = 0.85 * 0.83 = 0.706 = 70.6\%.$$

Although the a low profile backlight apparatus was illustrated and described herein as embodied in one or more specific examples, it is nevertheless not intended to be limited to the details shown. Various modifications and structural changes may be made therein without departing from the scope of the low profile backlight apparatus. Any modifications and structural changes are within the scope and range of equivalents of the claims. Accordingly, it is appropriate that the appended claims be construed broadly and in a manner consistent with the scope of the low profile backlight apparatus as set forth in the following claims.

What is claimed is:

1. A backlight apparatus, comprising:
   a point source of radiant electromagnetic energy;
   a low profile total internal reflection (TIR) lens having a central axis located along a path of the radiant electromagnetic energy to receive and evenly distribute the radiant electromagnetic energy at an output face, the radiant electromagnetic energy exiting the TIR lens being substantially collimated and defining optical paths parallel to the central axis;
   wherein the ratio of the focal distance to the diameter of the low profile TIR lens is in the range of about 0.2 to about 0.3;
   a deviator lens located along the optical path between the point source and the TIR lens to transmit the radiant electromagnetic energy from the point source to the TIR lens, the deviator lens having a hemispherically concave inner surface of greater curvature than a varying outer surface, wherein the varying outer surface is concave at the central axis and convex away from the central axis; and
   a first diffuser to receive the radiant electromagnetic energy from the output face of the TIR lens to spread the radiant electromagnetic energy to a predetermined first angle relative to the optical paths.

2. The backlight apparatus of claim 1, comprising a second diffuser located between the TIR lens and the first diffuser along the path of the radiant electromagnetic energy, the radiant electromagnetic energy exiting the second diffuser defining a second angle relative to the optical paths, wherein the second angle is less than the first angle.

3. The backlight apparatus of claim 1, wherein the point source comprises a light emitting diode (LED).

4. The backlight apparatus of claim 1, wherein the point source comprises a diffuser optic to diffuse the radiant electromagnetic energy into the TIR lens.

5. The backlight apparatus of claim 1, wherein the point source comprises:
   a reflector located below the TIR lens to reflect the radiant electromagnetic energy; and
   a diffuser optic located above the reflector to receive the reflected radiant electromagnetic energy and diffuse the radiant electromagnetic energy into the TIR lens.

6. The backlight apparatus of claim 1, comprising:
   a first white diffuser formed with a plurality of apertures located below the TIR lens; and
   a second solid white diffuser located below the first white diffuser;
   wherein the point source is located on the first white diffuser on either side of the plurality of apertures and positioned to radiate electromagnetic energy towards the second white diffuser;
   wherein the first and second white diffusers define an optical cavity therebetween to mix the radiant electromagnetic energy radiated from the point sources; and
   wherein the radiant electromagnetic energy reflected by the second white diffuser is received through the plurality of apertures and is diffused into the TIR lens.

7. The backlight apparatus of claim 1, wherein the first diffuser is a holographic diffuser.

8. The backlight apparatus of claim 1, wherein the TIR lens comprises a polygonal shape.

9. The backlight apparatus of claim 8, wherein the TIR lens comprises a square shape.

10. The backlight apparatus of claim 8, wherein the TIR lens diffuser comprises a hexagonal shape.

11. A backlight apparatus, comprising:
    a point source of radiant electromagnetic energy;
    a low profile total internal reflection (TIR) lens having a central axis located along a path of the radiant electromagnetic energy to receive and evenly distribute the radiant electromagnetic energy at an output face, the radiant electromagnetic energy exiting the TIR lens being substantially collimated and defining optical paths parallel to the central axis, wherein the ratio of the focal distance to the diameter of the low profile TIR lens is in the range of about 0.2 to about 0.3;
    a first white diffuser formed with a plurality of apertures located below the TIR lens; and
    a second solid white diffuser located below the first white diffuser;

wherein the point source is located on the first white diffuser on either side of the plurality of apertures and positioned to radiate electromagnetic energy towards the second white diffuser;

wherein the first and second white diffusers define an optical cavity therebetween to mix the radiant electromagnetic energy radiated from the point sources; and wherein the radiant electromagnetic energy reflected by the second white diffuser is received through the plurality of apertures and is diffused into the TIR lens.

12. The backlight apparatus of claim 11, comprising:

a first diffuser to receive the radiant electromagnetic energy from the output face of the TIR lens to spread the radiant electromagnetic energy to a predetermined first angle relative to the optical paths; and a second diffuser located between the TIR lens and the first diffuser along the path of the radiant electromagnetic energy, the radiant electromagnetic energy exiting the second diffuser defining a second angle relative to the optical paths, wherein the second angle is less than the first angle.

13. The backlight apparatus of claim 11, wherein the point source comprises a light emitting diode (LED).

14. The backlight apparatus of claim 11, comprising:

a deviator lens located along the optical path between the point source and the TIR lens to transmit the radiant electromagnetic energy from the point source to the TIR lens, the deviator lens having a hemispherically concave inner surface of greater curvature than a varying outer surface, wherein the varying outer surface is concave at the central axis and convex away from the central axis.

15. An optical apparatus, comprising:

a point source of radiant electromagnetic energy;

a low profile total internal reflection (TIR) lens having a central axis located along a path of the radiant electromagnetic energy to receive and evenly distribute the radiant electromagnetic energy at an output face, the radiant electromagnetic energy exiting the TIR lens being substantially collimated and defining optical paths parallel to the central axis;

wherein the ratio of the focal distance to the diameter of the low profile TIR lens is in the range of about 0.2 to about 0.3;

a deviator lens located along the optical path between the point source and the TIR lens to transmit the radiant electromagnetic energy from the point source to the TIR lens, the deviator lens having a hemispherically concave inner surface of greater curvature than a varying outer surface, wherein the varying outer surface is concave at the central axis and convex away from the central axis;

a first diffuser to receive the radiant electromagnetic energy from the output face of the TIR lens to spread the radiant electromagnetic energy to a predetermined first angle relative to the optical paths; and a liquid crystal display (LCD) element located between the TIR lens and the first diffuser.

16. The optical apparatus of claim 15, comprising a second diffuser located between the TIR lens and the LCD element along the path of the radiant electromagnetic energy, the radiant electromagnetic energy exiting the second diffuser defining a second angle relative to the optical paths, wherein the second angle is less than the first angle.

17. The optical apparatus of claim 15, wherein the point source comprises a light emitting diode (LED).

18. The optical apparatus of claim 15, wherein the point source comprises a diffuser optic to diffuse the radiant electromagnetic energy into the TIR lens.

19. The optical apparatus of claim 15, wherein the point source comprises:

a reflector located below the TIR lens to reflect the radiant electromagnetic energy; and a diffuser optic located above the reflector to receive the reflected radiant electromagnetic energy and diffuse the radiant electromagnetic energy into the TIR lens.

20. The optical apparatus of claim 15, comprising:

a first white diffuser formed with a plurality of apertures located below the TIR lens; and a second solid white diffuser located below the first white diffuser;

wherein the point source is located on the first white diffuser on either side of the plurality of apertures and positioned to radiate electromagnetic energy towards the second white diffuser;

wherein the first and second white diffusers define an optical cavity therebetween to mix the radiant electromagnetic energy radiated from the point sources; and wherein the radiant electromagnetic energy reflected by the second white diffuser is received through the plurality of apertures and is diffused into the TIR lens.

21. The optical apparatus of claim 15, wherein the first diffuser is a holographic diffuser.

22. The optical of claim 15, wherein the TIR lens comprises a polygonal shape.

23. The optical apparatus of claim 22, wherein the TIR lens comprises a square shape.

24. The optical apparatus of claim 22, wherein the TIR lens diffuser comprises a hexagonal shape.

* * * * *